July 23, 1963 W. S. GORMAN, JR 3,098,784
PROCESS OF DEINKING PRINTED PAPER
Filed Aug. 6, 1959
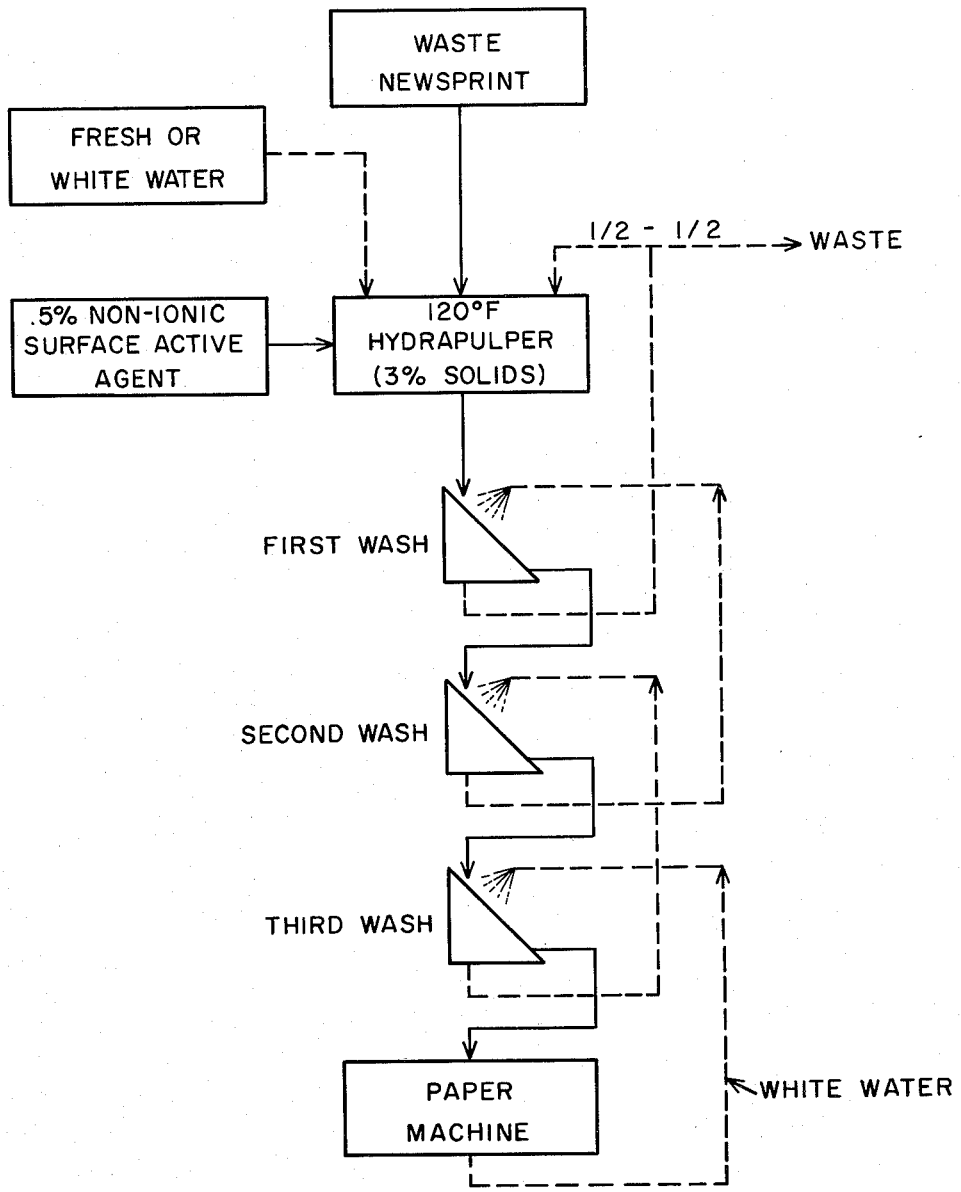
INVENTOR.
William S. Gorman Jr.
BY
ATTORNEY United States Patent Office 3,098,784
Patented July 23, 1963

3,098,784
PROCESS OF DEINKING PRINTED PAPER
William S. Gorman, Jr., Tonawanda, N.Y., assignor to National Gypsum Company, Buffalo, N.Y., a corporation of Delaware
Filed Aug. 6, 1959, Ser. No. 832,083
12 Claims. (Cl. 162—5)

This invention relates to a novel process for deinking printed paper whereby the ink contained in the paper is removed, leaving a fiber stock immediately reusable in the manufacture of new paper, cardboard, or the like.

There have been many processes previously proposed for deinking printed paper, however, to my knowledge, all prior processes have either been highly complex or overly costly or they involve strong, undesirable chemicals or resulted in a very poor quality end product. Prior deinking processes generally required an excessive number of process steps and amount of equipment. The best end product of prior processes seldom equalled the product of new fiber stock.

It is an object of the present invention to provide a deinking process involving only the addition of a single additional material into a slurry in a standard defibering step under certain controlled conditions followed by usual thickening and washing steps.

It is a further object of the invention to provide such a simplified process that will produce an improved fiber and resultant paper which in brightness and other general characteristics is superior even to processes employing new fiber stock.

These and other objects and advantages will appear more fully when considered in connection with the following detailed description of preferred embodiment of the invention and the accompanying drawing in which FIG. 1 is a flow diagram of the process of the invention.

The principal process step of the present invention consists of the treatment of printed paper in a slurry of from about 1% to 6% solids, containing from about .2% to 5.0%, based on the weight of fibers, of a water-soluble non-ionic surface active agent at a temperature of from about 90° to 180° F., and preferably 120° F. In the preferred form of the invention, this treatment is carried on in standard pulp defibering equipment or other agitating equipment for reducing the paper stock to substantially individual fibers.

It is essential, in accordance with the invention, that the printed paper have no substantial treatment, such as soaking, prior to being added to the solution containing the non-ionic surface active agent. Thus, in the preferred form, bales of newspapers will be merely untied and dumped, unshredded, into the solution.

The non-ionic surface active agent, in accordance with the invention, must be one which is water soluble. The preferred water soluble non-ionic surface active agent is an alkyl phenyl ether of polyethylene glycol, such as Tergitol NPX, or Tergitol TMN, products of Union Carbide Chemicals Company. Other suitable non-ionic surface active agents are, for example, Triton X-100, products of Rohm and Haas, identified as aryl alkyl polyether alcohol; Igepals, products of General Dyestuff Corporation, identified as a group of alkylphenolethylene oxide -condensation products; Ahcowet N, Ahcowet VL and Lissapol N, products of Arnold, Hoffman and Company, identified as ethylene oxide condensates.

The deinking by the above process has been found to be completed within whatever time is necessary to reduce the printed paper to substantially individual fibers, thus requiring no more time in the paper stock preparation than would be required if there were no deinking required. It has further been found that the deinking of the printed paper is in no way altered or deterred by simultaneous bleaching of the fibers, such as by the additional presence in the slurry of sufficient sodium peroxide to provide a pH of from about 9 to 10. A further important advantage of the novel process is its susceptibility to use with either hard or soft water and that process water can be re-used in the process.

Aside from the above defined limited use of a bleaching agent, the use of any caustics is particularly avoided, in comparison to many prior processes wherein excessive caustics were required and resulted in a degradation and yellowing discoloration of the fibers.

Following the above deinking process, conventional pulp washing equipment is employed wherein the slurry is thickened and simultaneously washed with progressively fresher water or progressive washing screens.

The flow diagram of FIG. 1 shows the preferred manner of carrying out the process of the invention. The waste newsprint is placed directly in defibering equipment, such as the Hydrapulper apparatus of the Black-Clawson Company, having therein a 120° F. water solution of preferably .5% non-ionic surface active agent. This solution is kept replenished by the addition of half of the waste water of a first washing processing, discussed herebelow, such additional fresh or white water as necessary and additional non-ionic surface active agent to maintain approximately a .5% solution. The defibered pulp, reduced in form substantially to individual fibers and with the ink separated therefrom, is then subjected to a first washing using waste water from a subsequent second washing process. Approximately half of the waste water of the first washing process is used as above described and the other half is disposed of. A second washing process follows using waste water from a third washing process, and a third washing process follows using clarified white water from a paper machine or fresh water. These washing processes are in accordance with prior pulp preparation practice.

Accordingly improved deinking of waste newsprint is provided by a novel composition and temperature condition of the slurry maintained in the otherwise standard pulp defibering step, followed by the usual pulp washing steps, a process thus readily adaptable to existing manufacturing facilities.

Paper, with the face plies manufactured from 100% waste newsprint, deinked in accordance with the above process, has been found to have the characteristics of a manila lined chip board and, more specifically, to have a purity and brightness sufficient to meet the requirements for a gypsum wallboard front liner, which, to my knowledge, has not heretofore been obtainable with any prior processes for the manufacture of 100% deinked newsprint paper, providing a great cost saving in the manufacture of paper and consequently gypsum wallboard made therefrom. A gypsum wallboard, made in accordance with the invention, includes a set gypsum core enclosed at least on the two faces thereof with paper, one liner thereof, intended as the exposed or front face, consisting of substantially 100% deinked paper fibers.

Having completed a detailed disclosure of the preferred embodiment of my invention so that those skilled in the art may practice the same, I contemplate that variations may be made without departing from the essence of the invention or the scope of the appended claims.

I claim:
1. The process of separating the cellulosic fibers of printed paper from the ink therein contained, which comprises the steps of adding said printed paper in substantially dry form to a solution of water and approximately .2% to 5.0% of a water soluble non-ionic surface active agent at a temperature of from about 90° to 180° F., forming a slurry thereby of from about 1% to 6% solids, substantially immediately agitating said slurry sufficiently to reduce said paper substantially to individual fibers, removing said fibers from said solution, and washing said fibers.

2. The process of claim 1 wherein said non-ionic surface active agent is an alkyl phenyl ether of polyethylene glycol.

3. The process of claim 1 wherein said non-ionic surface active agent is an aryl alkyl polyether alcohol.

4. The process of claim 1 wherein said non-ionic surface active agent is an alkylphenolethylene oxide condensation product.

5. The process of claim 1 wherein said non-ionic surface active agent is an ethylene oxide condensate.

6. The process of claim 1 wherein said solution is maintained at about 120° F. with a concentration of non-ionic surface active agent of about 0.5%.

7. The process of making from newsprint waste a paper having the characteristics of a manila lined chip-board comprising the steps of adding printed paper in substantially dry form to a solution of water and approximately .2% to 5.0% of a water soluble non-ionic surface active agent at a temperature of from about 90° to 180° F., forming a slurry thereby of from about 1% to 6% solids substantially immediately agitating said slurry sufficiently to reduce said paper substantially to individual fibers, removing said fibers from said solution, washing said fibers, and forming said fibers into paper.

8. The process of claim 7 wherein said non-ionic surface active agent is an alkyl phenyl ether of polyethylene glycol.

9. The process of claim 7 wherein said non-ionic surface active agent is an aryl alkyl polyether alcohol.

10. The process of claim 7 wherein said non-ionic surface active agent is an alkylphenolethylene oxide condensation product.

11. The process of claim 7 wherein said non-ionic surface active agent is an ethylene oxide condensate.

12. The process of claim 7 wherein said solution is maintained at about 120° F. with a concentration of non-ionic surface active agent of about .5%.

References Cited in the file of this patent

UNITED STATES PATENTS

| | | |
|---|---|---|
| 2,005,742 | Hines | June 25, 1935 |
| 2,007,470 | Harvey | July 9, 1935 |
| 2,286,924 | Nicholson | June 16, 1942 |
| 2,580,161 | Driessen | Dec. 25, 1951 |
| 2,614,922 | Hope | Oct. 21, 1952 |

FOREIGN PATENTS

| | | |
|---|---|---|
| 740,664 | Germany | Mar. 31 1944 |